(12) United States Patent
Shen et al.

(10) Patent No.: US 9,571,510 B1
(45) Date of Patent: Feb. 14, 2017

(54) SYSTEMS AND METHODS FOR IDENTIFYING SECURITY THREAT SOURCES RESPONSIBLE FOR SECURITY EVENTS

(71) Applicant: Symantec Corporation, Mountain View, CA (US)

(72) Inventors: Yun Shen, Dublin (IE); Olivier Thonnard, Alpes-Maritimes (FR)

(73) Assignee: Symantec Corporation, Mountain View, CA (US)

( * ) Notice: Subject to any disclaimer, the term of this patent is extended or adjusted under 35 U.S.C. 154(b) by 25 days.

(21) Appl. No.: 14/519,565

(22) Filed: Oct. 21, 2014

(51) Int. Cl.
*G06F 21/57* (2013.01)
*H04L 29/06* (2006.01)

(52) U.S. Cl.
CPC .................. *H04L 63/1416* (2013.01)

(58) Field of Classification Search
CPC .................................................. H04L 63/1433
See application file for complete search history.

(56) References Cited

U.S. PATENT DOCUMENTS

| | | | |
|---|---|---|---|
| 5,675,711 A | 10/1997 | Kephart et al. | |
| 8,272,061 B1* | 9/2012 | Lotem ............... | G06F 21/577 709/223 |
| 2006/0021045 A1* | 1/2006 | Cook ................. | H04L 63/1433 726/25 |
| 2006/0021049 A1* | 1/2006 | Cook ................. | G06F 21/577 726/25 |
| 2007/0061571 A1* | 3/2007 | Hammes ............ | G06F 21/31 713/168 |
| 2007/0079379 A1 | 4/2007 | Sprosts et al. | |
| 2008/0320095 A1 | 12/2008 | Pearson et al. | |

(Continued)

FOREIGN PATENT DOCUMENTS

WO   WO-2014/109645 A1   7/2014

OTHER PUBLICATIONS

Skormin, Victor et al., "Customized Normalcy Profiles for the Detection of Targeted Attacks", EvoApplications 2012, LNCS 7248, (Apr. 11, 2012), pp. 487-496.

(Continued)

*Primary Examiner* — Josnel Jeudy
(74) *Attorney, Agent, or Firm* — Fisherbroyles LLP

(57) ABSTRACT

The disclosed computer-implemented method for identifying security threat sources responsible for security events may include (1) identifying security-event data collected from a plurality of security events detected over a network, (2) partitioning the security-event data into a set of single-dimensional security clusters, each grouped by a common feature, (3) determining that a subset of the single-dimensional security clusters exceed a threshold level of similarity relative to one another, (4) grouping the subset of single-dimensional clusters into a multi-dimensional security cluster corresponding to a single threat source in response to determining that the subset of single-dimensional clusters exceed the threshold level of similarity relative to one another, and then (5) determining, based at least in part on grouping the single-dimensional clusters into the multi-dimensional cluster, that the single threat source is likely responsible for some of the security events. Various other methods, systems, and computer-readable media are also disclosed.

20 Claims, 6 Drawing Sheets

(56) References Cited

U.S. PATENT DOCUMENTS

| | | | |
|---|---|---|---|
| 2010/0162395 A1 | 6/2010 | Kennedy | |
| 2010/0192201 A1 | 7/2010 | Shimoni et al. | |
| 2011/0138471 A1* | 6/2011 | Van De Weyer | G06F 21/554 726/25 |
| 2013/0055385 A1* | 2/2013 | Antony | G06F 21/577 726/22 |
| 2013/0086685 A1 | 4/2013 | Haynes | |
| 2013/0312097 A1 | 11/2013 | Turnbull | |
| 2014/0130157 A1 | 5/2014 | Sallam | |
| 2014/0165207 A1 | 6/2014 | Engel et al. | |
| 2014/0283035 A1 | 9/2014 | Sawhney et al. | |
| 2014/0324985 A1 | 10/2014 | Stemm | |
| 2015/0007312 A1 | 1/2015 | Pidathala et al. | |

OTHER PUBLICATIONS

Thonnard, Olivier et al., "Industrial Espionage and Targeted Attacks: Understanding the Characteristics of an Escalating Threat", Research in Attacks, Intrusions, and Defenses; Lecture Notes in Computer Science, vol. 7462, (Sep. 12-14, 2012), pp. 64-85.

Wei, Chun, "Clustering Spam Domains and Hosts: Anti-Spam Forensics With Data Mining", A Dissertation, Submitted to the graduate faculty of The University of Alabama at Birmingham, in partial fulfillment of the requirements for the degree of Doctor of Philosophy, (2010).

Iqbal, Farkhund et al., "A novel approach of mining write-prints for authorship attribution in e-mail forensics", Digital Investigation 5, (2008), pp. S42-S51.

Alazab, Mamoun et al., "Malicious Spam Emails Developments and Authorship Attribution", 2013 Fourth Cybercrime and Trustworthy Computing Workshop, Sydney NSW, Australia, (Nov. 21-22, 2013), pp. 58-68.

Kevin Roundy, et al; Systems and Methods for Anomaly-Based Detection of Compromised IT Administration Accounts; U.S. Appl. No. 14/205,335, filed Mar. 11, 2014.

Kevin Alejandro Roundy, et al; Systems and Methods for Attributing Potentially Malicious Email Campaigns to Known Threat Groups; U.S. Appl. No. 14/461,810, filed Aug. 18, 2014.

Kevin Alejandro Roundy, et al; Systems and Methods for Classifying Security Events as Targeted Attacks; U.S. Appl. No. 14/513,804, filed Oct. 14, 2014.

"Industrial Espionage and Targeted Attacks: Understanding the Characteristics of an Escalating Threat", http://link.springer.com/chapter/10.1007%2F978-3-642-33338-5_4, as accessed on Jul. 31, 2014, (Sep. 12-14, 2012).

McWhorter, Dan "Mandiant Exposes APT1—One of China's Cyber Espionage Units & Releases 3,000 Indicators", https://www.mandiant.com/blog/mandiant-exposes-apt1-chinas-cyber-espionage-units-releases-3000-indicators/, as accessed on Jul. 31, 2014, (Feb. 18, 2013).

"Wombat Security Technologies", https://www.wombatsecurity.com/, as accessed Aug. 19, 2014, (Aug. 17, 2008).

Hu, Xin et al., "MutantX-S: Scalable Malware Clustering Based on Static Features", http://web.eecs.umich.edu/~huxin/papers/xin_MutantX.pdf, as accessed Aug. 19, 2014, 2013 USENIX Annual Technical Conference, (2013), pp. 187-198.

"FireEye", https://www.fireeye.com/, as accessed Aug. 19, 2014, (Oct. 12, 1999).

"Dell SecureWorks", http://www.secureworks.com/, as accessed Aug. 19, 2014, (Jan. 11, 1998).

"Mandiant", https://www.mandiant.com/, as accessed Aug. 19, 2014, (Feb. 4, 2006).

"Security Information & Event Management—SIEM", http://www8.hp.com/us/en/software-solutions/siem-security-information-event-management/, as accessed Aug. 19, 2014, Hewlett-Packard Development Company, L.P., (On or before Aug. 19, 2014).

"Cloud & Smarter Infrastructure", http://www.ibm.com/software/tivoli, as accessed Aug. 19, 2014, IBM, (Mar. 26, 2002).

"Business Assurance Technology", https://www.bluecoat.com/products/business-assurance-technology, as accessed Aug. 19, 2014, Blue Coat Systems, Inc., (On or before Aug. 19, 2014).

"Splunk®", http://www.splunk.com/en_us/solutions/solution-areas/security-and-fraud.html, as accessed Aug. 19, 2014, (On or before Aug. 19, 2014).

"LogRhythm", http://ecrm.logrhythm.com/P-Gartner2014MagicQuadrantSIEMReportLogRhythm-RT.html?utm_medium=cpc&utm_campaign=LogRhythmBrandTerms&AdGroup=LogRhythm&gclid=CjwKEAjw-o6hBRDOmsPSjqakuzYSJADR2V3SBBhEFHOQqwhx6DmQct0SnNlwIANXqwhSq0YJ6BT-6BoCl0Hw_wcB, as accessed Aug. 19, 2014, (On or before Aug. 19, 2014).

"RSA enVision", http://www.emc.com/support/rsa/eops/siem.htm, as accessed Aug. 19, 2014, EMC Corporation, (Apr. 7, 2012).

"Cisco Security Manager", http://www.cisco.com/c/en/us/products/security/security-manager/index.html, as accessed Aug. 19, 2014, (Aug. 12, 2014).

"Emerald Security Group", http://www.esgroupusa.com/, as accessed Aug. 19, 2014, (Feb. 7, 2012).

Zhao, Yao et al., "BotGraph: Large Scale Spamming Botnet Detection", Proceedings of the 6th USENIX Symposium on Networked Systems Design and Implementation, NSDI'09, USENIX Association, Berkeley, CA, (2009), pp. 321-334.

Zhuang, Li et al., "Characterizing Botnets from Email Spam Records", Proceedings of the 1st Usenix Workshop on Large-Scale Exploits and Emergent Threats, LEET'08, USENIX Association, Berkeley, CA, (2008), pp. 2:1-2:9.

Singh, Kamaldeep et al., "Big Data Analytics framework for Peer-to-Peer Botnet detection using Random Forests", Information Sciences, vol. 278, (Mar. 29, 2014), pp. 488-497.

Zhang, Qunyan et al., "Duplicate Detection for Identifying Social Spam in Microblogs", 2013 IEEE International Congress on Big Data (BigData Congress), (Jun. 2013), pp. 141-148.

Caruana, Godwin et al., "An ontology enhanced parallel SVM for scalable spam filter training", Neurocomputing, vol. No. 108, (May 2013), pp. 45-57.

Debar, Hervéet al., "Aggregation and Correlation of Intrusion-Detection Alerts", RAID 2001, LNCS 2212, (2001), pp. 85-103.

Techniques for Detecting Malicious Code; U.S. Appl. No. 14/035,519, filed Sep. 24, 2013.

* cited by examiner

Single-Dimensional Cluster 402(A)

| |
|---|
| Phone #s: 448709744065, 448702885031, 447045705331 |
| Emails: info@guinness.co.uk, info@info.com, guinnessanniversary@yahoo.co.uk |
| Subject Lines: Guinness Celebration, Guinness 250th anniversary, COCA-COLA Sharing Happiness |
| Date Range: 2008-06-20 – 2009-08-12 |

Single-Dimensional Cluster 402(F)

| |
|---|
| Phone #s: 447035960866, 448709744865, 448709744065 |
| Emails: online2035021@telkomsa.net, tmeesdsa@yahoo.com, informail2008@sify.com |
| Subject Lines: Congratulations, Award Sum, Winning Details, YOUR EMAIL HAVE BEEN SELECTED |
| Date Ranges: 2011-08-17 – 2010-06-20 |

Single-Dimensional Cluster 402(B)

| |
|---|
| Phone #s: 447045705331, 448702885031, 2348072238505 |
| Emails: yorkshire@ireland.ir, yorkshire.dept@gmail.com |
| Subject Lines: Yorkshire Loan!!!, Yorkshire Loan Apply Now, Your Fund Delivery Information! |
| Date Range: 2009-08-14 – 2010-08-10 |

Single-Dimensional Cluster 402(E)

| |
|---|
| Phone #s: 2348033819703, 448709744865, 2348072238505 |
| Emails: online2035021@telkomsa.net, yours_so_sweet@yahoo.com, kprivated1@btinternet.com |
| Subject Lines: Are you dead or alive? CALL ME, ARE YOU AWARE OF THIS TRANSFER |
| Date Range: 2011-02-05 – 2011-07-24 |

Single-Dimensional Cluster 402(C)

| |
|---|
| Phone #s: 2348072238505, 2348025946747 |
| Emails: exxon.mobile.ng@mail.mn, exxon@exxon.com, info@info.com |
| Subject Lines: YOUR EMAIL HAVE BEEN SELECTED, The Shell/Texaco Oil Company, Computer Sweepstakes |
| Date Range: 2010-00-09 – 2010-10-27 |

Single-Dimensional Cluster 402(D)

| |
|---|
| Phone #s: 2348025946747, 2348033819703 |
| Emails: felicia@adeka-asia.com, alincodept@yahoo.cn, test@methodistchurchkenya.org, info@info.com |
| Subject Lines: Your Fund Delivery Information!, YOUR FUND DELIVERY NOTIFICATION! |
| Date Range: 2010-11-02 – 2011-02-05 |

*FIG. 4*

SYSTEMS AND METHODS FOR IDENTIFYING SECURITY THREAT SOURCES RESPONSIBLE FOR SECURITY EVENTS

BACKGROUND

A comprehensive approach to protecting computer users from security threats may involve not only detecting and circumventing attacks but also identifying the source of the attacks. By applying such an approach, computer security systems may be able to quickly identify future attacks originating from the same source or following the same pattern. In addition, computer security systems may compile security data about certain attacks to identify the source and then share the security data with law enforcement organizations to assist with prosecutions.

The people and organizations behind these attacks typically leave identifiable traces and/or patterns in their work. For example, a phishing attack may include emails that originate from the same or similar email addresses. These emails may include the same addresses and/or phone numbers. Additionally or alternatively, the subject lines and/or bodies of the emails may include similar patterns of words, punctuation, and/or misspellings.

Unfortunately, analyzing security data to identify these patterns may prove to be a daunting task. Security databases may include billions of records of security events, and conventional computer security systems may be unable to identify certain patterns of security threats, much less identify the sources of such threats, by simply searching these records for repeated data. The instant disclosure, therefore, identifies and addresses a need for improved systems and methods for identifying security threat sources responsible for security events.

SUMMARY

As will be described in greater detail below, the instant disclosure describes various systems and methods for identifying security threat sources responsible for security events by partitioning security records into single-dimensional clusters based at least in part on certain shared features and then grouping the single-dimensional clusters into multi-dimensional clusters based at least in part on multiple features shared across the single-dimensional clusters. The systems and methods described herein may provide computing time advantages through the use of parallel and/or distributed processing.

In one example, a computer-implemented method for identifying security threat sources responsible for security events may include (1) identifying security-event data collected from a plurality of security events detected over a network, (2) partitioning the security-event data into a set of single-dimensional security clusters that are each grouped by a common feature, (3) determining that a subset of the single-dimensional security clusters exceed a threshold level of similarity relative to one another, (4) grouping the subset of single-dimensional security clusters into a multi-dimensional security cluster corresponding to a single threat source in response to determining that the subset of single-dimensional security clusters exceed the threshold level of similarity relative to one another, and then (5) determining, based at least in part on grouping the subset of single-dimensional security clusters into the multi-dimensional security cluster, that the single threat source is likely responsible for at least some of the plurality of security events detected over the network.

In some examples, partitioning the security-event data into the set of single-dimensional security clusters that are each grouped by the common feature may include (1) partitioning the security-event data into a set of security-event blocks, (2) determining that a subset of the security-event record blocks have a certain feature in common, and (3) grouping the subset of the security-event blocks that have the certain feature in common into a single-dimensional security cluster included in the set of single-dimensional security clusters in response to determining that the subset of the security-event records have the certain feature in common. In one embodiment, each of the security-event blocks may include one or more security-event records that include information about one or more of the security events detected over the network.

In some examples, determining that the subset of security-event blocks that have the certain feature in common may include (1) identifying a feature of a security-event block included in the set of security-event blocks, (2) identifying another feature of another security-event block included in the set of security-event blocks, and (3) determining, by comparing these features via a similarity function that measures the similarity of features among the set of security-event blocks, that these features exceed a threshold level of similarity relative to one another. In some examples, determining that the features exceed the threshold level of similarity relative to one another may include (1) determining that the features represent physical locations within a certain distance of one another, (2) determining that the features represent events occurring within a certain time period of one another, (3) determining that the features are numeric values within a certain range of one another, (4) determining that the features are sets of numeric values with a statistical correlation that exceeds a threshold, and/or (5) determining that the features are textual data with a semantic similarity that exceeds a threshold.

In some examples, partitioning the security-event data into the set of single-dimensional security clusters that are each grouped by the common feature may include reducing the number of security-event blocks included in the set of security-event blocks by identifying a plurality of security-event blocks included in the set of security-event blocks whose features exceed a threshold level of similarity relative to one another and then combining the security-event blocks into a single security-event record block. In some examples, determining that the subset of the single-dimensional security clusters exceed the threshold level of similarity relative to one another may include identifying single-dimensional security clusters for which the number of security events in each single-dimensional security cluster that have at least one feature in common is above a threshold.

In some examples, grouping the subset of single-dimensional security clusters into the multi-dimensional security cluster may include combining the subset of single-dimensional security clusters into the multi-dimensional security cluster due at least in part to the subset of single-dimensional security clusters exceeding the threshold level of similarity relative to one another by determining that a subset of the single-dimensional security clusters have another feature in common and then grouping the subset of single-dimensional security clusters that have the other feature in common into the multi-dimensional security cluster in response to determining that a subset of the single-dimensional security clusters have the other feature in common.

In some examples, the computer-implemented method may further include reducing the processing time required to determine that the single threat source is likely responsible for at least some of the security events by identifying several computing devices capable of processing the security-event data and then directing each of the computing devices to process at least a portion of the security-event data substantially in parallel to group the security-event data into a single-dimensional security cluster based at least in part on a common feature.

In some examples, the computer-implemented method may further include reducing the processing time required to determine that the single threat source is likely responsible for the at least some of the security events by identifying several computing devices capable of processing the security-event data and then directing each of the computing devices to process at least a portion of the security-event data substantially in parallel to group the subset of single-dimensional security clusters into the multi-dimensional security cluster based at least in part on at least one feature of the security-event data.

In one embodiment, a system for implementing the above-described method may include several modules stored in memory, such as (1) an identification module that identifies security-event data collected from a plurality of security events detected over a network, (2) a partitioning module that partitions the security-event data into a set of single-dimensional security clusters that are each grouped by a common feature, (3) an evaluation module that determines that a subset of the single-dimensional security clusters exceed a threshold level of similarity relative to one another, (4) a clustering module that groups the subset of single-dimensional security clusters into a multi-dimensional security cluster corresponding to a single threat source in response to determining that the subset of single-dimensional security clusters exceed the threshold level of similarity relative to one another, and (5) an analysis module that determines, based at least in part on the grouping of the subset of single-dimensional security clusters into the multi-dimensional security cluster, that the single threat source is likely responsible for at least some of the plurality of security events detected over the network. The system may also include at least one physical processor configured to execute the identification module, the partitioning module, the evaluation module, the clustering module, and the analysis module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify security-event data collected from a plurality of security events detected over a network, (2) partition the security-event data into a set of single-dimensional security clusters that are each grouped by a common feature, (3) determine that a subset of the single-dimensional security clusters exceed a threshold level of similarity relative to one another, (4) group the subset of single-dimensional security clusters into a multi-dimensional security cluster corresponding to a single threat source in response to determining that the subset of single-dimensional security clusters exceed the threshold level of similarity relative to one another, and (5) determine, based at least in part on the grouping of the subset of single-dimensional security clusters into the multi-dimensional security cluster, that the single threat source is likely responsible for at least some of the plurality of security events detected over the network.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a block diagram of a multi-dimensional security cluster.

Figure 1:
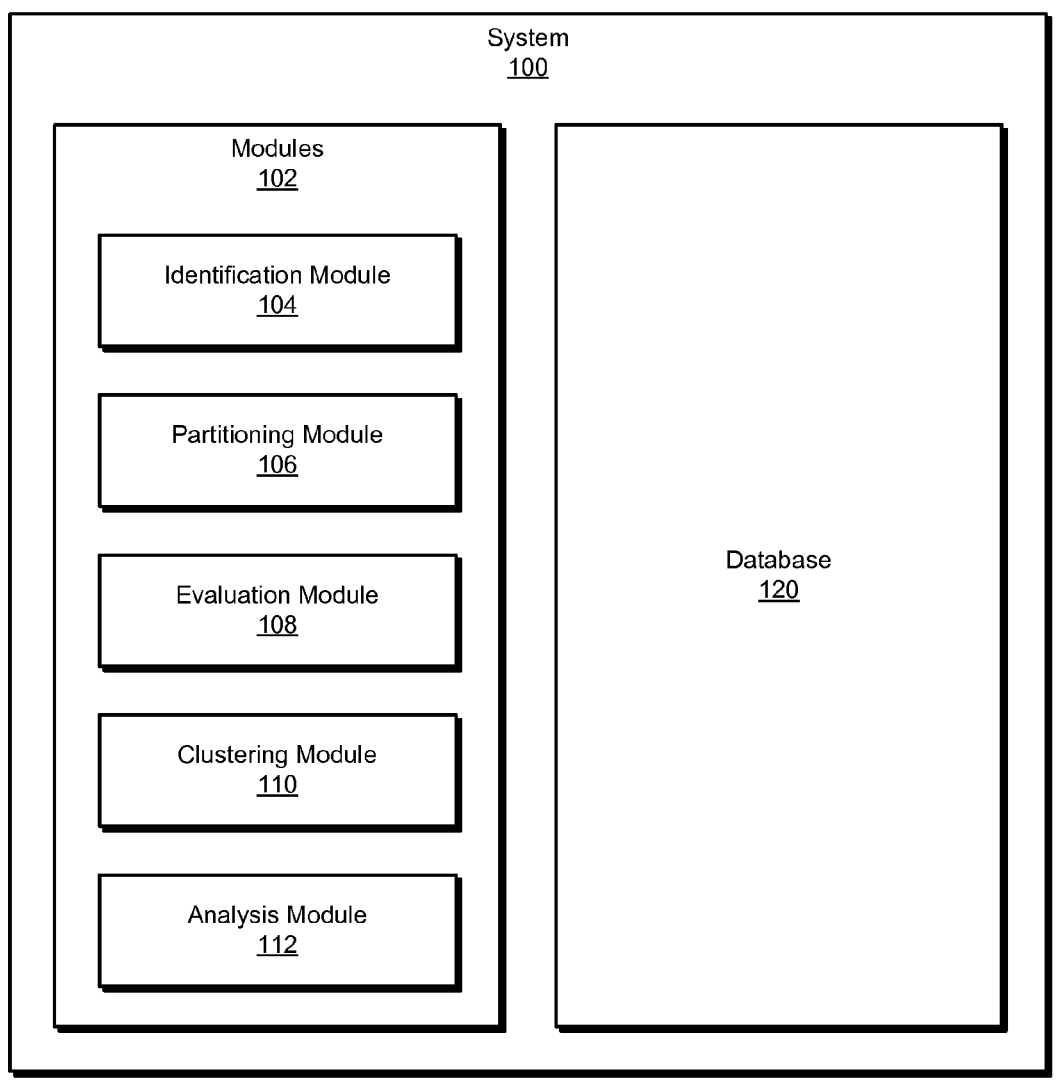
FIG. 1 is a block diagram of an exemplary system for identifying security threat sources responsible for security events.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for identifying security threat sources responsible for security events. As will be explained in greater detail below, the systems and methods described herein may identify shared features in security-event records to form single-dimensional clusters of security-event data. The systems and methods described herein may then identify additional features shared among the single-dimensional clusters to form a multi-dimensional cluster that corresponds to a likely threat source. The systems and methods described herein may involve parallel and/or distributed processing algorithms that provide the processing speed and/or time advantages for analyzing large amounts of security data.

Figure 2:
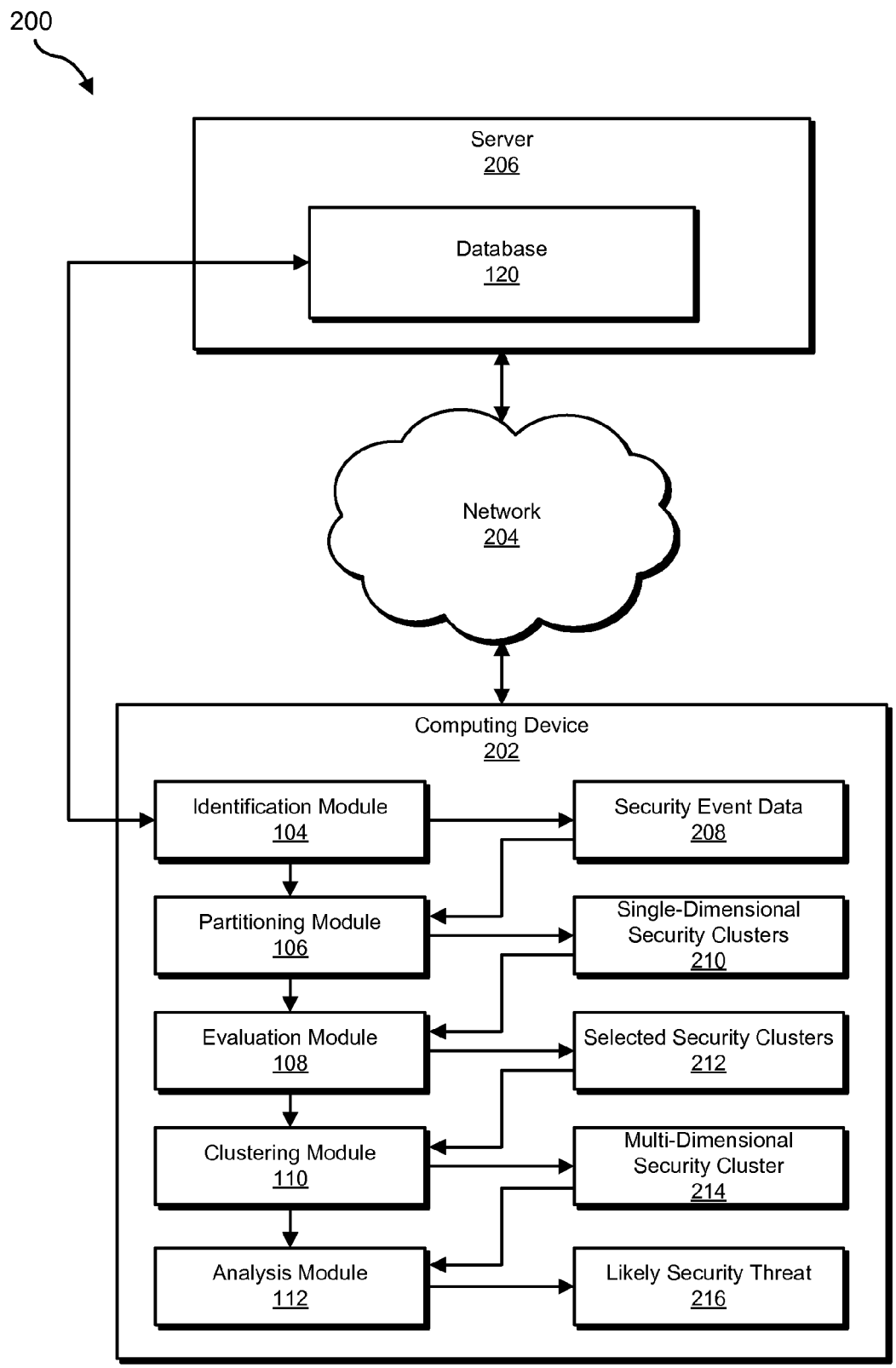
FIG. 2 is a block diagram of an additional exemplary system for identifying security threat sources responsible for security events.

The following will provide, with reference to FIGS. 1, 2, and 4, detailed descriptions of exemplary systems for identifying security threat sources responsible for security events. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for identifying security threat sources responsible for security events. As illustrated in this figure, exemplary system 100 may include one or more modules 102 for performing one or more tasks. For example, and as will be explained in greater detail below, exemplary system 100 may also include an identification module 104 that identifies security-event data collected from security events detected over a network. Exemplary system 100 may additionally include a partitioning module 106 that partitions the security-event data into a set of single-dimensional security clusters that are each grouped by a common feature. Exemplary system 100 may also include an evaluation module 108 that determines that a subset of the single-dimensional security clusters exceed a threshold level of similarity relative to one another.

Exemplary system 100 may further include a clustering module 110 that groups the subset of single-dimensional security clusters into a multi-dimensional security cluster in response to determining that the subset of single-dimensional security clusters exceed the threshold level of similarity relative to one another. Moreover, exemplary system 100 may include an analysis module 112 that determines, based at least in part on the grouping of the subset of single-dimensional security clusters into the multi-dimensional security cluster, that a single threat source is likely responsible for at least some of the security events detected over the network. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store security-event data, such as data collected from suspicious emails, malware infections, botnet attacks, denial-of-service attacks, etc. Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to identify security threat sources responsible for security events. For example, and as will be described in greater detail below, identification module 104 may identify security-event data 208 collected from a plurality of security events detected over a network 204. Partitioning module 106 may partition security-event data 208 into a set of single-dimensional security clusters 210 that are each grouped by a common feature. Evaluation module 108 may determine that a subset of single-dimensional security clusters 210 exceed a threshold level of similarity relative to one another, and thereby identifying selected security clusters 212. Clustering module 110 may group selected security clusters 212 into multi-dimensional security cluster 214 in response to determining that selected security clusters 212 exceed the threshold level of similarity relative to one another. Analysis module 112 may determine, based at least in part on the grouping of selected security clusters 212 into multi-dimensional security cluster 214, that a single threat source is likely responsible for at least some of the security events from which at least a portion of security-event data 208 was collected.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Server 206 generally represents any type or form of computing device that is capable of storing, comparing, and retrieving data. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
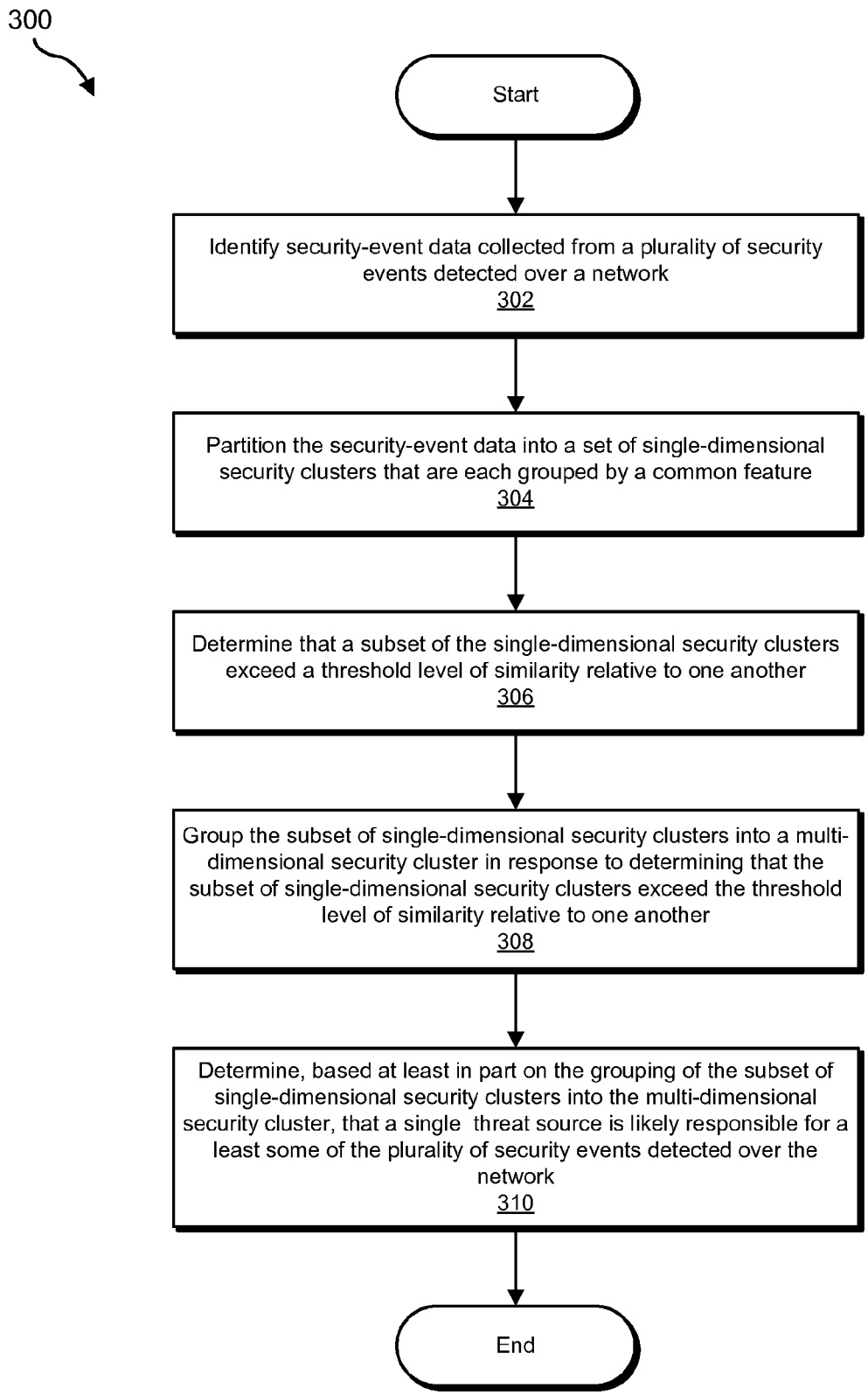
FIG. 3 is a flow diagram of an exemplary method for identifying security threat sources responsible for security events.

FIG. 3 is a flow diagram of an exemplary computer-implemented method 300 for identifying security threat sources responsible for security events. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify security-event data collected from a plurality of security events detected over a network. For example, identification module 104 may, as part of computing device 202 and/or server 206 in FIG. 2, identify security-event data 208 collected from a plurality of security events detected over network 204. In this example, security-event data 208 may reside in database 120 located on server 206.

As used herein, the term "security event" generally refers to any type or form of event, process, alert, and/or application that potentially implicates and/or affects the security of a computing device and/or network. Examples of security events include, without limitation, transmission and/or reception of emails, downloading and/or uploading files, creating and/or executing files, network activity and/or communications, malware infections, social-engineering attacks, suspicious activity, variations of one or more of the same, combinations of one or more of the same, or any other security events. Security-event data records may include fields (sometimes referred to herein as "features") related to how and/or when the data was collected, the data's apparent origin, the data's apparent target, the data's textual content, etc.

Identification module 104 may identify security-event data in a variety of ways. For example, identification module 104 may utilize a security-event database compiled by a security software publisher or other organization. Identification module 104 may filter security-event data to include data only from malware-infection events or phishing-email events, for example, to reduce the quantity of data to be analyzed and/or limit the analysis to a certain type of attack.

Returning to FIG. 3, at step 304 one or more of the systems described herein may partition the security-event data into a set of single-dimensional security clusters that are each grouped by a common feature. For example, partitioning module 106 may, as part of computing device 202 and/or server 206 in FIG. 2, partition security-event data 208 into a set of single-dimensional security clusters 210 that are each grouped by a common feature.

As used herein, the term "single-dimensional security cluster" generally refers to a group of security-event records that have a feature in common. Examples of the common feature include, without limitation, a common origin, a common network, a common network, a common email address, a common telephone number, identical or similar text, variations of one or more of the same, combinations of one or more of the same, or any other feature that security-event records have in common. In some examples, the common feature may be not necessarily identical across the security-event records but, rather, sufficiently similar across the security-event records. In some examples, the common feature may be representative of a statistically significant number of security-event records in the single-dimensional security cluster even though the feature may not necessarily be common to all of the records in the cluster.

Partitioning the security-event data and identifying a feature to represent the data in the single-dimensional security cluster may be a first step in reducing the quantity of data to be analyzed. Partitioning module 106 may partition the security-event data in a variety of ways. In some examples, partitioning module 106 may partition the security-event data into the set of single-dimensional security clusters that are each grouped by the common feature by first partitioning the security-event data into a set of security-event blocks. Partitioning module 106 may then determine that a subset of the security-event blocks have a certain feature in common.

Finally, in response to determining that the subset of the security-event records have the certain feature in common, partitioning module 106 may then group the subset of the security-event blocks that have that feature in common into a single-dimensional security cluster included in the set of single-dimensional security clusters. In one embodiment, each of the security-event blocks may include one or more security-event records that include information about one or more of the security events detected over the network.

By partitioning the security-event data and identifying a set of single-dimensional security clusters that share one or more common representative features, partitioning module 106 may reduce the quantity of data to be analyzed. For example, partitioning module 106 may determine that the subset of security-event blocks have the feature in common by first identifying a feature of a security-event block included in the set of security-event blocks. In this example, partitioning module 106 may also identify another feature of another security-event block included in the set of security-event blocks. By comparing the two features via a similarity function that measures the similarity of features among the set of security-event blocks, partitioning module 106 may then determine that these features exceed a threshold level of similarity relative to one another.

In some examples, partitioning module 106 may use various numerical and/or statistical methods when evaluating the similarity of features among the security-event blocks. For example, partitioning module 106 may determine that certain features exceed the threshold level of similarity relative to one another by determining that the features represent physical locations within a certain distance of one another. Partitioning module 106 may also determine that features exceed the threshold level of similarity relative to one another by determining that the features represent events occurring within a certain time period of one another. Additionally or alternatively, partitioning module 106 may determine that features exceed the threshold level of similarity relative to one another by determining that the features are numeric values within a certain range of one another or numeric values with a statistical correlation that exceeds a certain threshold. Partitioning module 106 may also determine that the features exceed the threshold level of similarity relative to one another by determining that the features are textual data with a semantic similarity that exceeds a certain threshold. In some examples, partitioning module 106 may count instances of syntactic features such as repeated strings or patterns of misspellings in addition to or in place of a semantic similarity metric.

Combining security-event blocks with similar features into one single-dimensional security cluster may reduce the quantity of data to be analyzed when identifying the source of a security threat. In some examples, the process of partitioning a security-event data set and selecting a feature that represents the subset of records may be repeated until the data has been partitioned into a number of single-dimensional security clusters that may be processed within a specific time period objective. Partitioning module 106 may partition the security-event data into the set of single-dimensional security clusters that are each grouped by the common feature further by reducing the number of security-event blocks included in the set of security-event blocks by identifying security-event blocks included in the set of security-event blocks whose features exceed a threshold level of similarity relative to one another, and then combining the plurality of security-event blocks into a single security-event record block.

As will be described in greater detail below, at several points in the computer-implemented method 300 depicted in FIG. 3, systems described herein may reduce the time required to analyze data by distributing certain analysis tasks among several processors. For example, partitioning module 106 may distribute each group of security-event data to a separate computing device (not necessarily illustrated in FIG. 2) to identify a shared feature that characterizes each group of data records as a single-dimensional security cluster.

Returning to FIG. 3, at step 306 one or more of the systems described herein may determine that a subset of the single-dimensional security clusters exceed a threshold level of similarity relative to one another. For example, evaluation module 108 may, as part of computing device 202 and/or server 206 in FIG. 2, determine that a subset of single-dimensional security clusters 210 exceed a threshold level of similarity relative to one another. In this example, the subset of similar single-dimensional security clusters 210 may include and/or represent selected security clusters 212.

Once the security-event data has been partitioned into single-dimensional security clusters and the number of security clusters reduced by combining similar single-dimensional security clusters, evaluation module 108 may begin the process of identifying relationships between the single-dimensional security clusters to facilitate combining these single-dimensional security clusters into a multi-dimensional security cluster. Evaluation module 108 may evaluate the similarity of the single-dimensional security clusters in a variety of ways. In some examples, evaluation module 108 may determine that the subset of the single-dimensional security clusters exceed the threshold level of similarity relative to one another by identifying single-dimensional security clusters for which the number of security events in each single-dimensional security cluster that have at least one feature in common is above a certain threshold. For example, evaluation module 108 may identify two single-dimensional security clusters of phishing email data, each characterized by different email addresses, but with a significant number of security-event records that have similar subject lines in each cluster.

As mentioned above, at several points in the computer-implemented method 300 depicted in FIG. 3, the systems described herein may reduce the time required to analyze data by distributing analysis tasks among several processors. The process of evaluating features of single-dimensional security clusters to identify a subset of security clusters with shared similar features may be fairly computation-intensive. Accordingly, this process may benefit significantly from the application of distributed and/or parallel processing.

In some examples, evaluation module 108 may distribute groups of single-dimensional security clusters to separate computing devices (not necessarily illustrated in FIG. 2) to identify the subset of single-dimensional security clusters for which the number of security events in each single-dimensional security cluster that have at least one feature in common is above a certain threshold. In one example, evaluation module 108 may reduce the processing time required to determine that the single threat source is likely responsible for at least some of the of the security events by identifying several computing devices capable of processing the security-event data. Evaluation module 108 may then direct each of the plurality of computing devices to process at least a portion of the security-event data substantially in parallel to facilitate grouping the security-event data into a single-dimensional security cluster based at least in part on a common feature.

Returning to FIG. 3, at step 308 one or more of the systems described herein may group the subset of single-dimensional security clusters into a multi-dimensional security cluster corresponding to a single threat source in response to determining that the subset of single-dimensional security clusters exceed the threshold level of similarity relative to one another. For example, clustering module 110 may, as part of computing device 202 and/or server 206 in FIG. 2, group selected security clusters 212 into multi-dimensional security cluster 214 in response to determining that selected security clusters 212 exceed the threshold level of similarity relative to one another. In this example, multi-dimensional security cluster 214 may represent and/or correspond to a single threat source.

As used herein, the term "multi-dimensional security cluster" generally refers to a set of single-dimensional security clusters that have been identified as being related to one another by one or more features exceeding a threshold level of similarity relative to one another. The term "threat source," as used herein, generally refers to any type or form of designation, organization, and/or group that includes one or more members known to perpetrate cyberattacks. Examples of such threat sources include, without limitation, Anonymous, Covert Grove, CyberVor, Honker Union, Red-Hack, TeaMp0isoN, TeslaTeam, UGNazi, variations of one or more of the same, or any other known threat groups.

Clustering module 110 may group single-dimensional security clusters into a multi-dimensional security cluster in a variety of ways. In some examples, clustering module 110 may group the subset of single-dimensional security clusters into the multi-dimensional security cluster by combining the subset of single-dimensional security clusters into the multi-dimensional security cluster due at least in part to the subset of single-dimensional security clusters exceeding the threshold level of similarity relative to one another. To do so, clustering module 110 may first determine that a subset of the single-dimensional security clusters have another feature in common. In response to determining that a subset of the single-dimensional security clusters have the other feature in common, clustering module 110 may group the subset of the single-dimensional security clusters that have the other feature in common into the multi-dimensional security cluster.

By way of illustration, a set of several single-dimensional security clusters including security-event data from a series of malware attacks may each be characterized by the variety of malware employed in the attack. One group of several single-dimensional clusters may be related by a shared network address from which the attacks originated. A subset of those single-dimensional clusters may also be related to a second group of single-dimensional clusters by a shared network address to which the attacks were apparently directed. Additionally, a subset of the second group of single-dimensional clusters may be related to a third group of single-dimensional clusters by a network address the malware program was designed to contact upon execution. These relationships between the separate groups of single-dimensional security clusters may indicate that a single threat source is responsible for all the attacks even though few security-event data records in the first single-dimensional security cluster have features in common with security-event records in the third security cluster.

In some examples, clustering module 110 may employ a data analysis process known as Multi-Criteria Decision Analysis. The term "Multi-Criteria Decision Analysis" and the abbreviation "MCDA," as used herein, generally refer to any type or form of algorithm and/or analysis that clusters and/or groups security-related data and/or information into data sets based at least in part on certain commonalities, techniques, and/or features. Accordingly, MCDA techniques may enable clustering module 110 to identify complex patterns and/or relationships among certain security events in connection with the organization. For example, clustering module 110 may apply MCDA techniques to security events involving certain network addresses. By applying the MCDA techniques to these security events, clustering module 110 may be able to cluster groups of single-dimensional security clusters to create multi-dimensional security cluster 214 based at least in part on these clusters and/or groups.

Additionally or alternatively, clustering module 110 may apply MCDA techniques to selected security clusters 212 to increase its level of classification accuracy. In one example, clustering module 110 may apply MCDA techniques to determine and/or select a particular threshold for one or more features of the selected security clusters 212. For example, clustering module 110 may determine that features of a security-event record in one single-dimensional security cluster must match a certain number of features of a security-event record in another single-dimensional security cluster in order for the two security-event records to be considered similar to one another. Clustering module 110 may also determine that at least a certain percentage of the security-event records in each cluster must be considered similar to one another in order to classify the two single-dimensional security clusters as related and/or likely part of a targeted attack from a single threat source.

As mentioned above, at several points in the computer-implemented method 300 depicted in FIG. 3, the systems described herein may reduce the time required to analyze data by distributing analysis tasks among several processors. For example, clustering module 110 may utilize parallel and/or distributed processing to reduce the processing time required to determine that the single threat source is likely responsible for at least some of the security events detected over the network. To do so, clustering module 110 may first identify several computing devices capable of processing the security-event data. Clustering module 110 may then direct each of the computing devices to process at least a portion of the security-event data substantially in parallel to group the subset of single-dimensional security clusters into the multi-dimensional security cluster based at least in part on one or more features of the security-event data.

Returning to FIG. 3, at step 310 one or more of the systems described herein may determine, based at least in part on the grouping of the subset of single-dimensional security clusters into the multi-dimensional security cluster, that the single threat source is likely responsible for at least some of the plurality of security events detected over the network. For example, analysis module 112 may, as part of computing device 202 and/or server 206 in FIG. 2, determine that the single threat source is likely responsible for at least some of the security events detected over network 204. Analysis module 112 may base at least a portion of this determination on the grouping of the subset of selected security clusters 212 into multi-dimensional security cluster 214, which corresponds to the single threat source.

Analysis module 112 may employ any suitable means in determining that the grouping of the subset of single-dimensional security clusters into the multi-dimensional security cluster indicates that a single threat source is likely responsible for at least some of the plurality of security events detected over the network. Analysis module 112 may, for example, accept the grouping yielded by clustering module 110 without further refinement as a cluster of security events likely attributable to a single threat source. In some examples, analysis module 112 may apply additional statistical tests to verify the strength of the relationships between the single-dimensional security clusters included in the multi-dimensional cluster.

FIG. 4 is a block diagram depicting data summaries of phishing email security-event records included in several single-dimensional security clusters 401(A)-402(F) that form a multi-dimensional security cluster 400. As illustrated in FIG. 4, single-dimensional cluster 402(A) may identify certain phone numbers (in this example, "448709744065," "448702885031," and "447045705331"), certain email addresses (in this example, "info@guinness.co.uk," "info@info.com," and "guinessanniversary@yahoo.com"), certain email subject lines (in this example, "Guinness Celebration," "Guinness 250th anniversary," and "COCA-COLA Sharing Happiness"), and a certain date range (in this example, "2008-06-20-2009-08-12"). Similarly, single-dimensional cluster 402(B) may identify certain phone numbers (in this example, "447045705331," "448702885031," and "2348072238505"), certain email addresses (in this example, "yorkshire@ireland.ir" and "yorkshire.dept@gmail.com"), certain email subject lines (in this example, "Yorkshire Loan!!!," "Yorkshire Loan Apply Now," and "Your Fund Delivery Information !"), and a certain date range (in this example, "2009-08-14-2010-08-10"). The phone number "4470457055331" found in both single-dimensional clusters 402(A) and 402(B) may indicate a relationship between the email security-event records found in those two single-dimensional clusters.

As further illustrated in FIG. 4, single-dimensional cluster 402(C) may identify certain phone numbers (in this example, "2348072238505" and "2348025946747"), certain email addresses (in this example, "exxon.mobile.ng@mail.mn," "exxon@exxon.com," and "info@info.com"), certain email subject lines (in this example, "YOUR EMAIL HAVE BEEN SELECTED," "The Shell/Texaco Oil Company," and "Computer Sweepstakes"), and a certain date range (in this example, "2010-01-09-2010-10-27"). Similarly, single-dimensional cluster 402(D) may identify certain phone numbers (in this example, "23480225946747" and "2348033819703"), certain email addresses (in this example, "felicia@adeka-asia.com," "alincodept@yahoo.cn," "test@methodistchurchkenya.org," and "info@info.com"), certain email subject lines (in this example, "Your Fund Delivery Information!" and "YOUR FUND DELIVERY NOTIFICATION"), and a certain date range (in this example, "2010-11-02-2011-02-05"). The phone number "23480225946747" and the email address "info@info.com" found in both single-dimensional clusters 402(C) and 402(D) may indicate a relationship between the email security-event records found in those two single-dimensional clusters. Additionally, the phone number "2348072238505" found in both single-dimensional clusters 402(B) and 402(C) indicates a relationship between the email security-event records found in those two single-dimensional clusters. Moreover, the subject line "Your Fund Delivery Information!" found in both single-dimensional clusters 402(B) and 402(D) may also indicate a relationship between the email security-event records found in those two single-dimensional clusters.

As additionally illustrated in FIG. 4, single-dimensional cluster 402(E) may identify certain phone numbers (in this example, "2348033819703," "448709744065," and "2348072238505"), certain email addresses (in this example, "online2035021@telkomsa.net,"

"yours_so_sweet@yahoo.com," and "kprivated1@btinternet.com"), certain email subject lines (in this example, "Are you dead or alive?" and "CALL ME, ARE YOU AWARE OF THIS TRANSFER"), and a certain date range (in this example, "2011-02-05-2011-07-24"). Similarly, single-dimensional cluster 402(F) may identify certain phone numbers (in this example, "447035960866" and "448709744065"), certain email addresses (in this example, "online2035021@telkomsa.net," "tmeesdsa@yahoo.com," and "informail2008@sify.com"), certain email subject lines (in this example, "Congratulations," "Award Sum," "Winning Details," and "YOUR EMAIL HAVE BEEN SELECTED"), and a certain date range (in this example, "2011-08-17-2012-06-20"). The phone number "448709744865" and the email address "online2035021@telkomsa.net" found in both single-dimensional clusters 402(E) and 402(F) may indicate a relationship between the email security-event records found in those two single-dimensional clusters. Additionally, the phone number "2348033819703" found in both single-dimensional clusters 402(D) and 402(E) may indicate a relationship between the email security-event records found in those two single-dimensional clusters. Moreover, the phone number "2348072238505" found in both single-dimensional clusters 402(C) and 402(E) may indicate a relationship between the email security-event records found in those two single-dimensional clusters. Further, the phone number "448709744065" found in both single-dimensional clusters 402(A) and 402(F) may indicate a relationship between the email security-event records found in those two single-dimensional clusters.

In the example illustrated in FIG. 4, single-dimensional clusters 402(A)-(F) may each be characterized by two or three phone numbers. Some of these phone numbers may originate from a single location (e.g., phone numbers with identical or similar area and/or country codes). Evaluation module 108 may determine that single-dimensional clusters 402(A)-(F) are related to one another based at least in part on similarities detected among the single-dimensional clusters' phone numbers or other features, such as email addresses, subject lines, etc. As indicated by the date ranges, multi-dimensional security cluster 400 may represent a phishing email campaign that originates from a single organization and extends over a period of a few years.

As described above, the systems and methods described herein may identify security threat sources responsible for security events by identifying shared features in security-event data records to form single-dimensional clusters of security-event data. The systems and methods described herein may then identify additional features shared among the single-dimensional clusters to form a multi-dimensional cluster that corresponds to a specific threat source. Accordingly, the systems and methods may determine that at least a portion of the security-event data records likely originated from the specific threat source. Through the use of distributed algorithms, the systems and methods described herein may provide the processing speed advantages needed to analyze large quantities of security data typically found in security-event databases.

Figure 5:
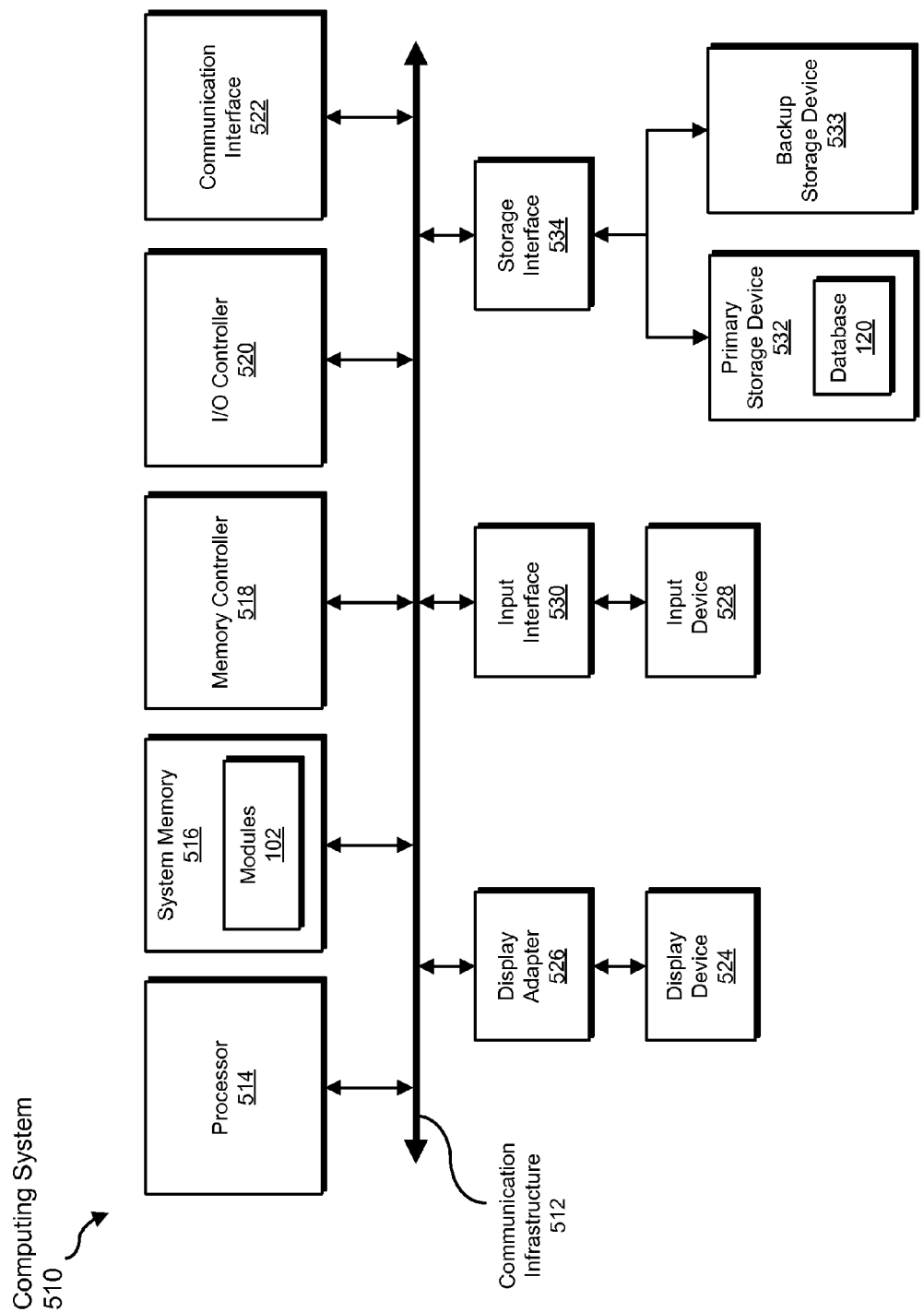
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
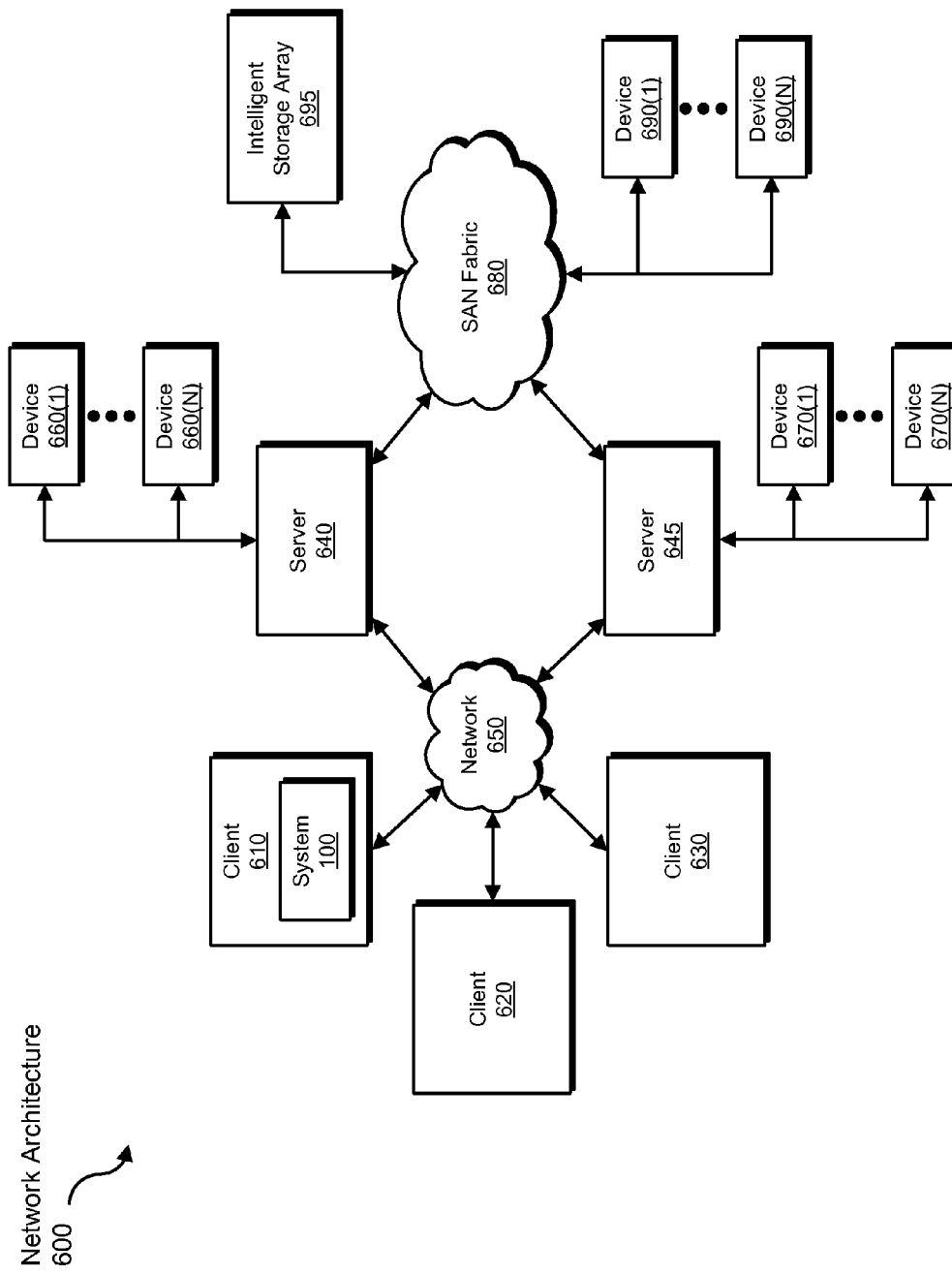
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for identifying security threat sources responsible for security events.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data to be transformed, transform the [data], and use the result of the transformation to identify security threat sources responsible for security events. One or more of the modules recited herein may also transform a computing system into a system for identifying security threat sources responsible for security events. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting a computing system from a cyberattack, at least a portion of the method being performed by a computing device comprising at least one processor; the method comprising: identifying security-event data collected from a plurality of security events detected over a network; partitioning the security-event data into a set of single-dimensional security clusters that are each grouped by a common feature; determining that a subset of the single-dimensional security clusters exceed a threshold level of similarity relative to one another; grouping the subset of single-dimensional security clusters into a multi-dimensional security duster corresponding to a single threat source in response to determining that the subset of single-dimensional security dusters exceed the threshold level of similarity relative to one another; determining, based at least in part on grouping the subset of single-dimensional security dusters into the multi-dimensional security cluster, that the single threat source is responsible for at least some of the plurality of security events detected over the network; and performing a security action with respect to a computing system within the network to protect the computing system from a cyberattack perpetrated by the single threat source based at least in part on the determination that the single threat source is responsible for the at least some of the plurality of security events, wherein the security action comprises: compiling, from the multi-dimensional security cluster, information identifying the single threat source as being responsible for the plurality of security events: and transmitting, to a law enforcement organization, the information identifying the single threat source as being responsible for the plurality of security events to assist in a criminal prosecution of the single threat source.

2. The computer-implemented method of claim 1, wherein partitioning the security-event data into the set of single-dimensional security clusters that are each grouped by the common feature comprises:
- partitioning the security-event data into a set of security-event blocks;
- determining that a subset of the security-event record blocks have a certain feature in common; and
- grouping the subset of the security-event blocks that have the certain feature in common into a single-dimensional security cluster included in the set of single-dimensional security clusters in response to determining that the subset of the security-event records have the certain feature in common.

3. The computer-implemented method of claim 2, wherein each of the security-event blocks comprises at least one security-event record that includes information about at least one of the plurality of security events detected over the network.

4. The computer-implemented method of claim 2, wherein
- determining that the subset of security-event blocks have the certain feature in common comprises:
- identifying a feature of a security-event block included in the set of security-event blocks;
- identifying another feature of another security-event block included in the set of security-event blocks; and
- determining, by comparing the feature and the other feature via a similarity function that measures a similarity of features among the set of security-event blocks, that the feature and the other feature exceed a threshold level of similarity relative to one another.

5. The computer-implemented method of claim 4, wherein determining that the feature and the other feature exceed the threshold level of similarity relative to one another comprises at least one of:
- determining that the features represent physical locations within a certain distance of one another;
- determining that the features represent events occurring within a certain time period of one another;
- determining that the features are numeric values within a certain range of one another;
- determining that the features are sets of numeric values with a statistical correlation that exceeds a threshold; and
- determining that the features are textual data with a semantic similarity that exceeds a threshold.

6. The computer-implemented method of claim 2, wherein partitioning the security-event data into the set of single-dimensional security clusters that are each grouped by the common feature further comprises:
- reducing the number of security-event blocks included in the set of security-event blocks by:
  - identifying a plurality of security-event blocks included in the set of security-event blocks whose features exceed a threshold level of similarity relative to one another; and
  - combining the plurality of security-event blocks into a single security-event record block.

7. The computer-implemented method of claim 1, wherein determining that the subset of the single-dimensional security clusters exceed the threshold level of similarity relative to one another comprises:
- identifying a plurality of single-dimensional security clusters for which the number of security events in each single-dimensional security cluster that have at least one feature in common is above a threshold.

8. The computer-implemented method of claim 1, wherein grouping the subset of single-dimensional security clusters into the multi-dimensional security cluster comprises:
- combining the subset of single-dimensional security clusters into the multi-dimensional security cluster due at least in part to the subset of single-dimensional security clusters exceeding the threshold level of similarity relative to one another by:
  - determining that a subset of the single-dimensional security clusters have another feature in common; and
  - grouping the subset of the single-dimensional security clusters that have the other feature in common into the multi-dimensional security cluster in response to determining that the subset of the single-dimensional security clusters have the other feature in common.

9. The computer-implemented method of claim 1, further comprising reducing a processing time required to determine that the single threat source is responsible for the at least some of the plurality of security events by: identifying a plurality of computing devices capable of processing the security-event data; and directing each of the plurality of computing devices to process at least a portion of the security-event data in parallel to group the security-event data into a single-dimensional security cluster based at least in part on a common feature.

10. The computer-implemented method of claim 1, further comprising reducing a processing time required to determine that the single threat source is responsible for the at least some of the plurality of security events by: identifying a plurality of computing devices capable of processing the security-event data; and directing each of the plurality of computing devices to process at least a portion of the security-event data in parallel to group the subset of single-dimensional security dusters into the multi-dimensional security cluster based at least in part on at least one feature of the security-event data.

11. A system for protecting a computing system from a cyberattack, the system comprising: an identification module; stored in memory, that identifies security-event data collected from a plurality of security events detected over a network; a partitioning module, stored in memory, that partitions the security-event data into a set of single-dimensional security dusters that are each grouped by a common feature; an evaluation module, stored in memory, that determines that a subset of the single dimensional security clusters exceed a threshold level of similarity relative to one another; a clustering module, stored in memory, that groups the subset of single-dimensional security clusters into a multi-dimensional security cluster corresponding to a single threat source in response to determining that the subset of single-dimensional security dusters exceed the threshold level of similarity relative to one another; an analysis module; stored in memory, that: determines, based at least in part on the grouping of the subset of single dimensional security clusters into the multi-dimensional security duster, that a single threat source is responsible for at least some of the plurality of security events detected over the network; performs a security action with respect to a computing system within the network to protect the computing system from a cyberattack perpetrated by the single threat source based at least in part on the determination that the single threat source is responsible for the at least some of the plurality of security events, wherein the security action comprises: compiling, from the multi-dimensional security cluster, information identifying the single threat source as being responsible for the plurality of security events: and transmitting, to a law enforcement organization, the information identifying the single threat source as being responsible for the plurality of security events to assist in a criminal prosecution of the single threat source: and at least one physical processor configured to execute the identification module, the partitioning module, the evaluation module, the clustering module, and the analysis module.

12. The system of claim 11, wherein the partitioning module partitions the security-event data into the set of single-dimensional security clusters that are each grouped by the common feature by:
partitioning the security-event data into a set of security-event blocks;
determining that a subset of the security-event record blocks have a certain feature in common; and
grouping the subset of the security-event blocks that have the certain feature in common into a single-dimensional security cluster included in the set of single-dimensional security clusters in response to determining that the subset of the security-event records have the certain feature in common.

13. The system of claim 12, wherein each of the security-event blocks comprises at least one security-event record that includes information about at least one of the plurality of security events detected over the network.

14. The system of claim 12, wherein the analysis module determines that the subset of security-event blocks have the certain feature in common by:
identifying a feature of a security-event block included in the set of security-event blocks;
identifying another feature of another security-event block included in the set of security-event blocks; and
determining, by comparing the feature and the other feature via a similarity function that measures a similarity of features among the set of security-event blocks, that the feature and the other feature exceed a threshold level of similarity relative to one another.

15. The system of claim 13, wherein the analysis module determines that the feature and the other feature exceed the threshold level of similarity relative to one another by at least one of:
determining that the features represent physical locations within a certain distance of one another;
determining that the features represent events occurring within a certain time period of one another;
determining that the features are numeric values within a certain range of one another;
determining that the features are sets of numeric values with a statistical correlation that exceeds a threshold; and
determining that the features are textual data with a semantic similarity that exceeds a threshold.

16. The system of claim 12, wherein the partitioning module partitions the security-event data into the set of single-dimensional security clusters that are each grouped by the common feature further by:
reducing the number of security-event blocks included in the set of security-event blocks by:
identifying a plurality of security-event blocks included in the set of security-event blocks whose features exceed a threshold level of similarity relative to one another; and
combining the plurality of security-event blocks into a single security event record block.

17. The system of claim 11, wherein the analysis module determines that the subset of the single-dimensional security clusters exceed the threshold level of similarity relative to one another by:
identifying a plurality of single-dimensional security clusters for which the number of security events in each single-dimensional security cluster that have at least one feature in common is above a threshold.

18. The system of claim 11, wherein the clustering module groups the subset of single-dimensional security clusters into the multi-dimensional security cluster by:
combining the subset of single-dimensional security clusters into the multi-dimensional security cluster due at least in part to the subset of single-dimensional security clusters exceeding the threshold level of similarity relative to one another by:
determining that a subset of the single-dimensional security clusters have another feature in common; and
grouping the subset of the single-dimensional security clusters that have the other feature in common into the multi-dimensional security cluster in response to determining that a subset of the single-dimensional security clusters have the other feature in common.

19. The system of claim 11, further comprising a reducing module, stored in memory, that reduces a processing time required to determine that the single threat source is responsible for the at least some of the plurality of security events by: identifying a plurality of computing devices capable of processing the security-event data; and directing each of the plurality of computing devices to process at least a portion of the security-event data in parallel to group the security-event data into a single-dimensional security duster based at least in part on a common feature.

20. A non-transitory computer-readable medium comprising one or more computer-readable instructions that, when executed by at least one processor of a computing device, cause the computing device to: identify security-event data collected from a plurality of security events detected over a network; partition the security-event data into a set of single-dimensional security clusters that are each grouped by a common feature; determine that a subset of the single-dimensional security clusters exceed a threshold level of similarity relative to one another; group the subset of single-dimensional security dusters into a multi-dimensional security cluster corresponding to a single threat source in response to determining that the subset of single-dimensional security clusters exceed the threshold level of similarity relative to one another; determine, based at least in part on the grouping of the subset of single-dimensional security dusters into the multi-dimensional security duster, that the single threat source is responsible for at least some of the plurality of security events detected over the network: and perform a security action with respect to a computing system within the network to protect the computing system from a cyberattack perpetrated by the single threat source based at least in part on the determination that the single threat source is responsible for the at least some of the plurality of security events, wherein the security action comprises: compiling, from the multi-dimensional security cluster, information identifying the single threat source as being responsible for the plurality of security events: and transmitting, to a law enforcement, the information identifying the single threat source as being responsible for the plurality of security events to assist in a criminal prosecution of the single threat source.

\* \* \* \* \*

UNITED STATES PATENT AND TRADEMARK OFFICE
CERTIFICATE OF CORRECTION

PATENT NO. : 9,571,510 B1  
APPLICATION NO. : 14/519565  
DATED : February 14, 2017  
INVENTOR(S) : Yun Shen et al.

Page 1 of 1

It is certified that error appears in the above-identified patent and that said Letters Patent is hereby corrected as shown below:

In the Claims

Claim 1, Column 20, Lines 58-63 should read:
security cluster corresponding to a single threat source in response to determining that the subset of single-dimensional security clusters exceed the threshold level of similarity relative to one another; determining, based at least in part on grouping the subset of single-dimensional security clusters into the multi-dimensional security cluster, that the single threat source is likely Claim 10, Column 22, Line 50 should read:
dimensional security clusters into the multi-dimensional Claim 11, Column 22, Line 59 should read:
sional security clusters that are each grouped by a common Claim 11, Column 22, Line 67 should read:
single-dimensional security clusters exceed the threshold Claim 19, Column 24, Line 45 should read:
event data into a single-dimensional security cluster based at Claim 20, Column 24, Line 57 should read:
single-dimensional security clusters into a multi-dimensional Claim 20, Column 24, Line 63 should read:
security clusters into the multi-dimensional security cluster, Signed and Sealed this
Twenty-third Day of May, 2017

Michelle K. Lee
*Director of the United States Patent and Trademark Office*